Aug. 15, 1961  J. W. BEATTY  2,995,993
OBLIQUE IMAGE COMPENSATING CAMERA
Filed July 22, 1960  4 Sheets-Sheet 3
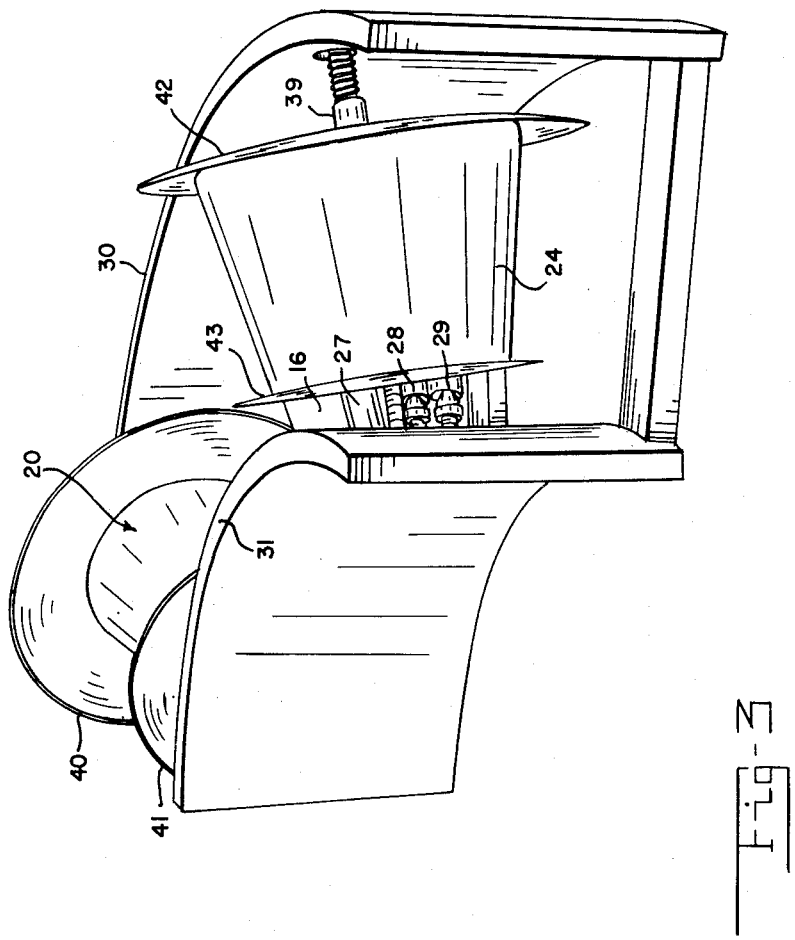
INVENTOR.
JOHN W. BEATTY
BY
ATTORNEY
AGENT Aug. 15, 1961 J. W. BEATTY 2,995,993
OBLIQUE IMAGE COMPENSATING CAMERA
Filed July 22, 1960 4 Sheets-Sheet 4
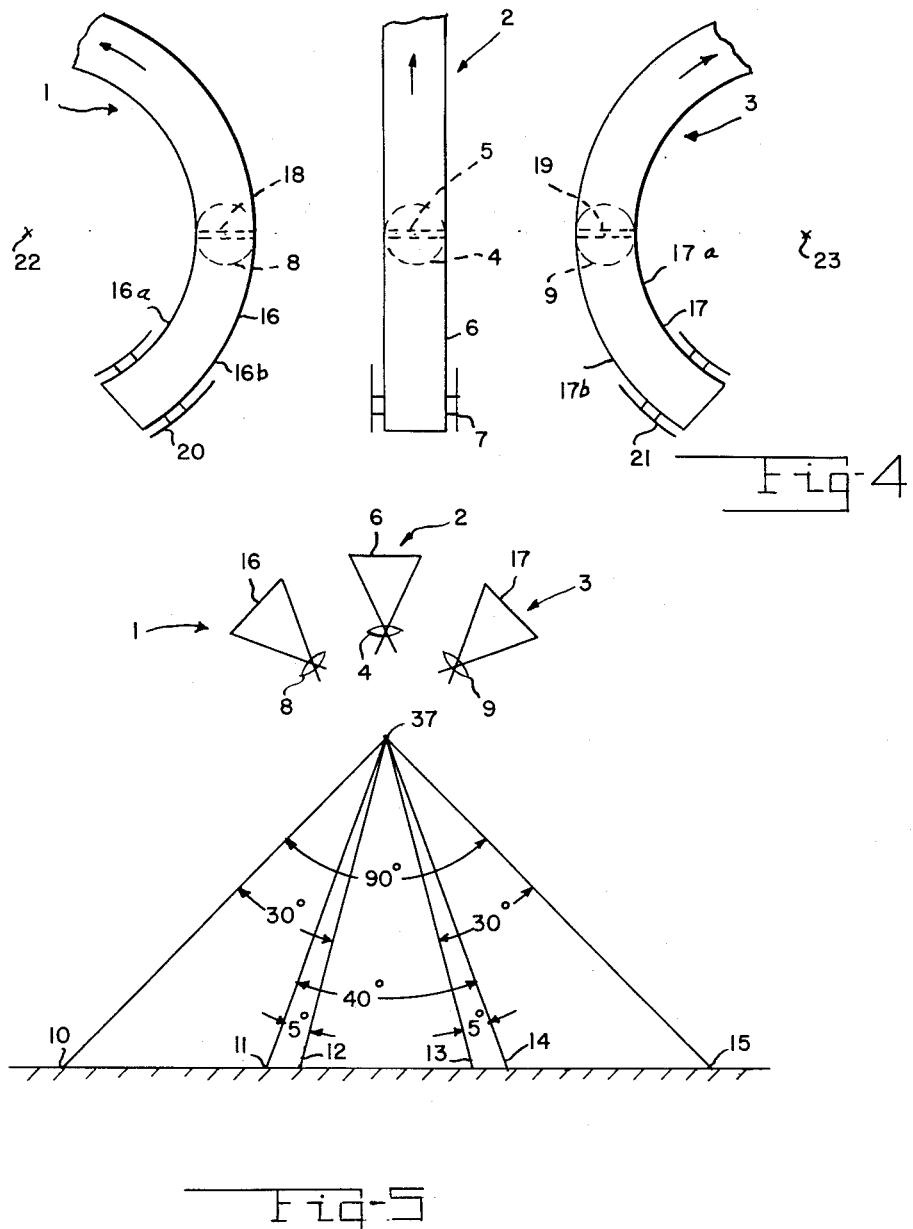
INVENTOR.
JOHN W. BEATTY United States Patent Office 2,995,993
Patented Aug. 15, 1961

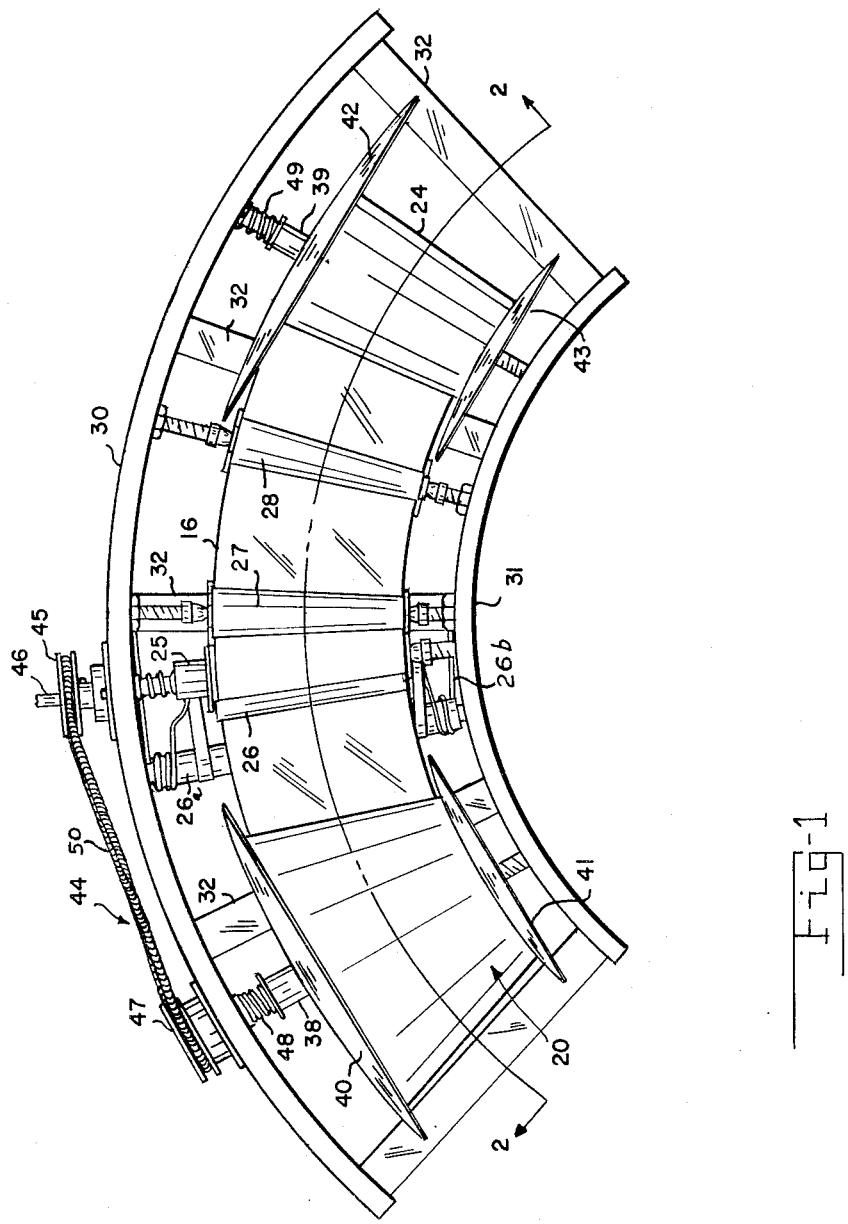

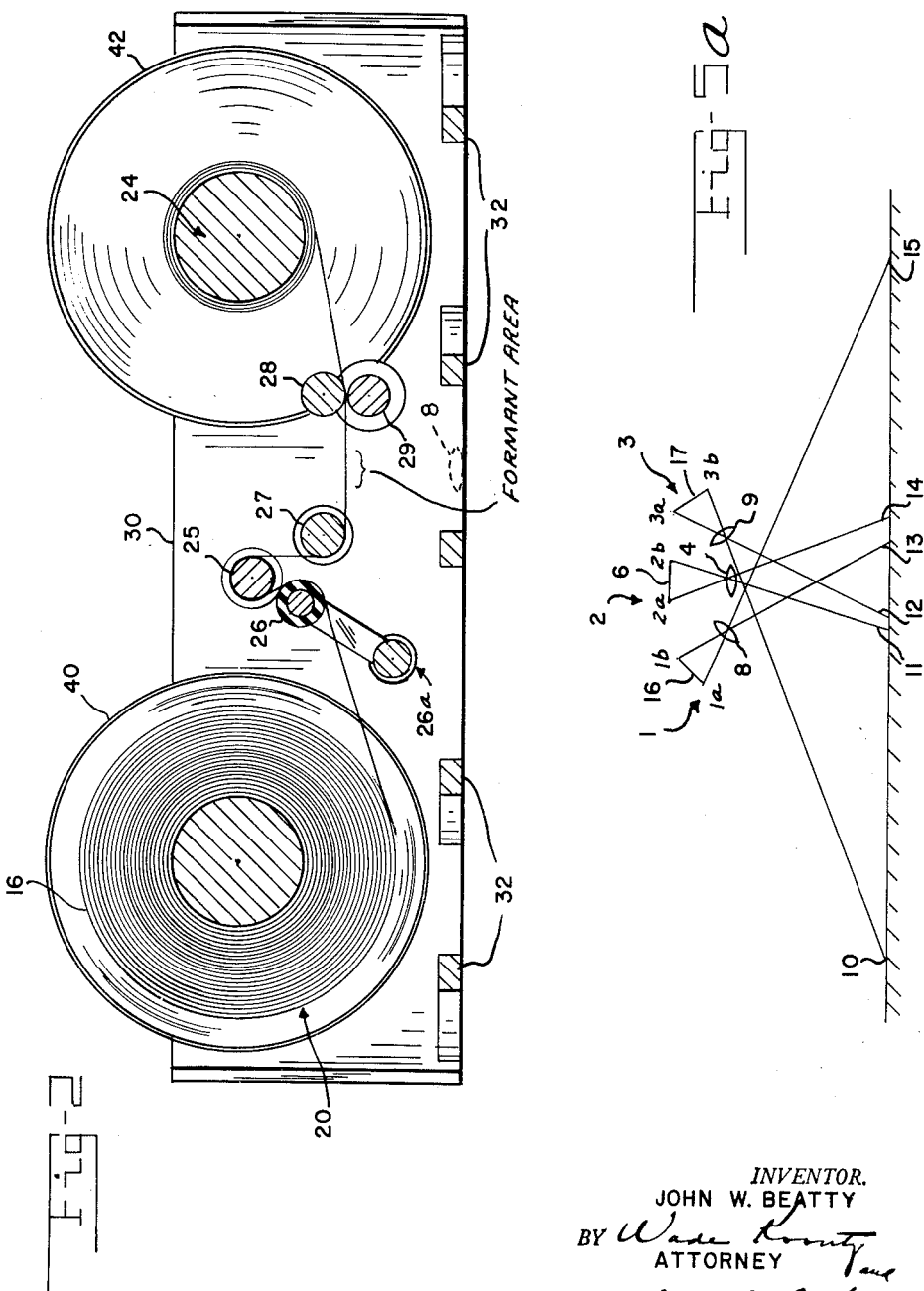

2,995,993
OBLIQUE IMAGE COMPENSATING CAMERA
John W. Beatty, Dayton, Ohio, assignor to the United States of America as represented by the Secretary of the Air Force
Filed July 22, 1960, Ser. No. 44,823
8 Claims. (Cl. 95—12.5)
(Granted under Title 35, U.S. Code (1952), sec. 266)

The invention described herein may be manufactured and used by or for the United States Government for governmental purposes without payment to me of any royalty thereon.

This invention relates generally to an airborne strip camera and, more particularly, to an oblique image graded compensating camera.

In aerial photography, it is normally desired to photograph a wide area of terrain to include considerable lateral distances relative to the flight path of the aircraft in a minimum of elapsed time. The usual method of accomplishing this objective involves mounting three aerial strip cameras in side-by-side relation within the aircraft. The center strip camera is mounted with its optical axis aligned vertically relative to the earth's surface or, in other words, depressed 90° to record images of the terrain substantially directly below the aircraft. The right and left strip cameras are mounted at oblique angles relative to the vertical for recording, respectively, left and right oblique images of the terrain. These left and right oblique terrain images may be classified as either high oblique, in which event, the horizon is included or low oblique omitting the horizon. In the above-described arrangement, only the vertically mounted, center camera provides for proper Image Motion Compensation (IMC) across its entire film format. On the other hand, images recorded by the left and right oblique strip cameras incorporate increasing distortion and/or scale error across the film format at greater and greater lateral distances from the vertical. This distortion and/or scale error is caused by the fact that the far and near images of various terrain features being photographed fail to arrive at the film at the same time. This condition is, of course, especially aggravated either during periods of poor illumination or at night. Heretofore, the only known technique compensating for, or providing an image motion compensating means, involves running the film in such aerial strip cameras at a continuous speed corresponding to the apparent speed of the aircraft which, in turn, is related to the ground speed and altitude of the aircraft. However, driving such film at a continuous speed, as stated above, still did not adequately overcome the above-mentioned distortion and scale error. Accordingly, it is quite evident that some other means must be utilized to overcome the aforesaid errors and distortion inherent in the ordinary aerial strip camera when used at an oblique angle to the vertical and especially under conditions of poor illumination. In this manner, a more accurate pictorial representation may be made of the earth's surface especially in regard to terrain images received from the greater lateral distances from the aircraft. Moreover, military requirements dictate that a rapid and yet accurate method for recording precise images of a maximum amount of terrain in a minimum of time be developed. In other words, a completely reliable and accurate pictorial representation must be accomplished by the military under extreme circumstances which might make it impossible for a return flight to the same area.

It is an object of the present invention, therefore, to provide an aerial strip type camera adapted to be mounted within an aircraft at an oblique angle and incorporating improved means for obtaining graded image motion compensation.

It is a further object of the invention to utilize an aerial strip camera having improved means designed to enhance its resolution capability especially under conditions of poor illumination and while set at an oblique angle.

It is a still further object of the invention to have an obliquely set, aerial strip camera incorporating improved film means compensating for the difference in time interval resulting from differences in distance to the far and near images.

An additional object of the invention involves an aerial strip camera having curved film means compensating for the increasingly slow rate of time intervals for images received from remote objects.

Other objects and advantages of the invention will become apparent from the following description taken in connection with the accompanying drawings, in which like reference characters refer to like parts in the several figures.

FIG. 1 is a top, partially broken away, view of the image motion compensating mechanism of the present invention, illustrating details of the film feed mechanism for the inventive camera.

FIG. 2 is a cross-sectional view taken about on line 2—2 of FIG. 1 illustrating additional details of the feed mechanism of the invention.

FIG. 3 is a side view, partly in perspective, of part of the inventive camera mechanism, illustrating the angled relation of certain elements utilized therewith.

FIG. 4 is a second top view, schematic in form, illustrating the relationship between the inventive camera device and the ordinary strip camera.

FIG. 5 is another schematic view of the invention, more accurately illustrating the relationship between the ratios of the mean and major diameters of the inventive film to the corresponding distances through which the film is graded.

FIG. 5a is a schematic diagram of the invention, illustrating the basic relationship between three aerial strip cameras and the film utilized therewith when mounted in side-by-side relation within an aircraft and with the relative amount of terrain covered by each.

Referring specifically to FIG. 4 of the drawings, three aerial strip cameras are shown mounted in side-by-side relation and are indicated generally at 1, 2 and 3, respectively. In this manner, maximum coverage of the terrain to be photographed may be effected with the center camera 2 depressed vertically to cover the terrain directly below the aircraft and the left and right cameras set to cover, respectively, the terrain in an oblique direction to the right and left of vertical. Under the usual conditions, all three aerial strip cameras incorporate film having parallel lateral side edges and driven at continuous speeds corresponding to the apparent motion resulting from the aircraft flying at a specified altitude and ground speed. As a practical matter, however, such an arrangement does not satisfactorily solve the problem of scale error and distortion, hereinafter mentioned, and, as a result, a mosaic thereof is formed in which the central portions recorded on each film strip are cut out and joined together along adjacent lateral side edges. In this manner, the distortion and scale error inherent in the left and right oblique film strips is averaged out or to some extent compensated but still leaves much to be desired. However, the unique arrangement to be hereinafter described in detail relative to the oblique image compensating camera of the instant invention constitutes improved means for effecting the required image motion compensation across the entire film format and substantially eliminating the above-described inherent errors.

The center camera 2, which utilizes the film 6 having parallel lateral side edges, again, as clearly seen in FIG.

4 of the drawings, incorporate a camera slit indicated schematically at 5 and a lens indicated schematically at 4, which lens 4 is positioned in the normal manner at a predetermined distance from the film 6 in accordance with its focal length. Camera slit 5 is, of course, adjustable in size and is located in the usual manner immediately beneath and adjacent to the film 6. A straight feed spool is also shown schematically at 7 for driving the film 6. Thus, as clearly seen in FIGS. 5 and 5a of the drawings, center strip camera 2 is mounted with its optical axis vertically aligned relative to the earth's surface or, in other words, depressed at a 90° angle, in order to record images of the terrain substantially directly beneath the aircraft and extending from the ground point 11 on the left of vertical to the ground point 14 on the right of vertical.

The previously mentioned left and right cameras indicated at 1 and 3 are each mounted at an oblique angle for recording images of terrain, respectively, to the right and left of the vertical axis. These oblique images may or may not actually include the horizon as stated hereinbefore. Thus, again referring particularly to FIGS. 5 and 5a of the drawings, camera 1 incorporates a lens 8 for receiving images of the terrain extending from the ground point 13 on the left to the ground point 15 on the right. Obviously, ground point 13 is travelling at a substantially greater apparent speed than is ground point 15 relative to the aircraft due to the more remote location of ground point 15. Camera 3 incorporates a lens 9 for receiving images of the terrain extending from ground point 12 on the right to ground point 10 on the left. Again, it is obvious that ground point 12 is travelling at a much greater apparent speed than is ground point 10 relative to the aircraft due to the more remote location of ground point 10. Cameras 1 and 3 also each incorporate a camera slit, indicated schematically at 18 and 19, respectively, positioned adjacent respective films 16 and 17 thereof. The previously-mentioned difference in apparent speed of the near and far images naturally results in distortion and scale error which errors are all but eliminated by the system of the present invention as will be hereinafter described in detail.

With the improved oblique image compensating camera of the present invention, however, the above-described difference in apparent terrain speed relative to the aircraft is compensated for in a unique and novel manner. Accordingly, cameras 1 and 3 are both equipped with identical curved film, indicated respectively at 16 and 17 which film substantially counteracts the above-mentioned distortion and scale errors. Thus, if the films 16 and 17, for each of cameras 1 and 3 are graded across their entire formats in proportion to the changing film speed between the left and right lateral side edges thereof, the above-described difference in ground speed between the near and far points photographed will be eliminated.

With specific reference to FIGS. 4, 5 and 5a of the drawings, both left and right oblique cameras 1 and 3 are illustrated as incorporating identically but oppositely curved films 16 and 17. Additionally, cameras 1 and 3 each include a tapered and arcuate spool indicated schematically at 20 and 21, respectively, for supporting and assisting in the transport of the aforesaid films 16 and 17. Other details of the support and drive means therefor will be described in more detail hereinafter. The important characteristic of the inventive film arrangement for both cameras 1 and 3 resides in a system providing for varying the speed across the entire format of respective films 16 and 17 thereof between the left and right lateral side edegs. Thus, in film 16, for example, should its right side edge 1b be moving at a faster rate but in correct proportion to that of left side edge 1a, images received by lens 8 of the terrain between previously-described points 13 and 15 on the ground would be in properly graded image motion compensating (IMC) register across the entire format of the film 16. The same would also be correct for left and right lateral side edges 3a and 3b of film 17 of right oblique camera 3 in that images of the terrain received from between ground points 10 and 12 would be in properly graded image motion compensating (IMC) register across the entire film format thereof. In regard to center camera 2, however, the difference in film speed between left side edge 2a, right side edge 2b and the central portion of center film 6 is so slight as to be considered negligible. In other words, the problem of error and scale distortion is acute only for the obliquely set aerial strip cameras, as for example cameras 1 and 3 of the instant invention. The proper image motion compensation is obtained, therefore, by means of utilizing film as at 16 or 17 for either camera 1 or 3 proportionally curved in the manner to be described in more detail hereinafter.

As schematically illustrated in FIGS. 4 and 5 of the drawings, all three cameras, 1, 2 and 3 are so positioned in side-by-side relation that their optical axes cross at the identical point 37 (note FIG. 5) for the purpose of definitely fixing the position of each camera. Note that there is a certain amount of overlap of the terrain covered between adjacently mounted cameras. This terrain overlap may, of course, be adjusted as desired. In the example shown schematically in FIG. 5 of the drawing, center camera 2 is shown as photographing the terrain through an angular coverage of 40°, whereas, each of said cameras 1 and 3 is depicted as photographing their respective terrain segments through an angular coverage of 30° which, with a 5° overlap between each of cameras 1 and 3 and center camera 2, results in a total terrain coverage of 90°. The latter may, of course, be varied as desired. Also, the 5° overlap is merely for purposes of illustration and obviously may likewise be varied without departing from the true spirit and scope of the invention. In order to compensate for the inherent errors in resolution and scale distortion found in the left and right oblique portions of the total terrain being photographed, films 16 and 17 are arranged with their lateral side edges, respectvlely, indicated at 16a and 16b, and 17a and 17b curved in predetermined manner as will be hereinafter explained in detail in order to compensate for the inherent difference in travel time between the images received from the near and more remote locations in a lateral direction relative to the aircraft flight path. It will be noted that, in the usual arrangement, the films in all three aerial strip cameras 1, 2 and 3 are driven at a speed directly proportional to the apparent ground speed and inversely proportional to the altitude of the aircraft. For example, a single lens type of aerial strip camera using a 9″ film and employing an 8″ focal length covers approximately 55° of the terrain being photographed in a lateral direction transverse to the line of flight. At an altitude of 4,000 feet, the scale is approximately 1:6,000. Even at higher speeds, shorter focal lengths and narrower film, as for example, 70 mm. film, only 55° coverage may still be provided, but with a corresponding loss to a scale of 1:16,000 and, in fact, the fastest lens presently available or even planned is approximately 8″ or 9″ in focal length, and utilizes a 9″ film with a film speed of $f/2.0$. In either event, a 2″ wide camera slit is necessary to obtain the 5 second exposure required for the aforesaid fastest lens. Equivalent film exposures are obtained with a lens speed of $f/2.0$, a focal length of 3″, a 0.75″ slit and a film width of 70 mm., or a lens speed of $f/0.9$, a focal length of 3″, a 0.15″ slit and a 70 mm. width film, or a lens speed of $f/0.9$, a focal length of 5.5″, a 0.27″ slit and a 70 mm. width film, all at a given altitude and ground speed.

In view of the above, it is clear that improved resolution and adequate scale across the entire film format is obtained for increased lateral coverages of the terrain with the utilization of shorter focal lengths and higher speed camera lenses in the order of $f/0.9$ or 5 times the lens speed of $f/2.0$ and allowing for ⅕ of the camera slit width normally required for a 5 second exposure or, in other words, a 1 second exposure. Further, increased lateral coverage with adequate resolution and scale is enhanced by the use of the previously described three aerial strip cameras 1, 2 and 3 positioned in side-by-side relation and especially with the two outside cameras 1 and 3 each incorporating film curved in predetermined manner as set forth in the present invention. Thus, curved lateral side edges 16a, 16b, 17a, 17b of films 16 and 17, respectively (note FIG. 4), of cameras 1 and 3 each represent one side of a corresponding pair of concentric arcs of a plurality of concentrically arranged circles, whose centers are indicated respectively at 22 and 23. Each of the innermost arcs 16a, 17a represents the mean diameter of a first concentric circle and each of the outermost arcs 16b, 17b represents the major diameter of a second concentric circle. Said mean and major diameters are formed in respective concentric pairs which are in the same ratio relative to each other as are the ratios of the distances measured from lenses 8 and 9 of cameras 1 and 3, respectively, to the nearest and remotest points of terrain coverage measured in a lateral direction relative to the light path. In other words, the ratio of the mean diameter of the concentric circle forming lateral side edge 16a and the major diameter of the concentric circle forming lateral side edge 16b of camera 1 is made directly proportional to the ratio of the length of leg 37—13, representing the distance between camera lens 8 and the nearest terrain point 13 photographed by camera 1 and the length of leg 37—15, representing the distance between camera lens 8 and the remotest terrain point 15 photographed by camera 1. Expressed in another way, the mean diameter, curved lateral side edge 16a, is to the major diameter, curved lateral side edge 16b, as leg 37—13 is to leg 37—15. Similarly, the mean diameter of curved lateral side edge 17a (note camera 3) is to the major diameter of curved lateral side edge 17b as leg 37—12 is to leg 37—10, respectively, representing the distances between lens 9 of camera 3 and the nearest and remotest points photographed thereby. In this manner, therefore, the film speed is graded across the entire format from the leftmost point of terrain coverage to the rightmost point of terrain coverage for both cameras 1 and 3. Thus, the increasingly apparent slow rate of motion of the more remote images received and recorded on obliquetly set films 16 and 17, respectively, of cameras 1 and 3 is proportionately compensated for by the lateral side edges of each film 16, 17 being curved, as hereinbefore described, in precise proportion to the ratio of the distances between each of said cameras and the near and far points of coverage on the ground. Moreover, the speed of each curved film 16, 17 progressively increases in exact proportion to the curvature thereof across the entire film format thereof from the mean diameters 16a and 17a, respectively, inwardly to the major diameters 16b and 17b, respectively. Accordingly, images received by left and right oblique cameras 1 and 3 are in properly graded image motion compensating register across the entire film format.

Referring particularly to FIGS. 1, 2 and 3 of the drawings, aerial strip camera 1 is shown, partially broken away and in cross section, to illustrate certain additional details of the inventive camera. Since camera 1 is identical to camera 3, the details of each are the same and, therefore, reference is hereinafter made only to camera 1. It is to be understood, however, that whatever is described hereafter relative to camera 1 is repeated for camera 3. Camera 1 includes a main supply or film storage spool 24, a take-up spool 20 and a plurality of rollers interspersed therebetween. Take-up spool 20 and film storage spool 24 incorporate rotatably positioned cylinders, indicated respectively at 38 and 39, as positioned in widely spaced and angled relation to each other and tapered to accommodate the difference in diameter effected between opposite end portions of film 16, for example, resulting from the curvature thereof as said film is wound onto said take-up spool 20 and/or rewound on film storage spool 24. Moreover, the opposite rim portions indicated generally at 40, 41 and 42, 43 incorporated, respectively, for each of said take-up and storage spools 20, 24 are made unequal in size and form, respectively, arcs of a circle whose diameter is equal, respectively, to the previously-described lateral side curved edges 16a and 16b, also, to accommodate the curvature thereof and thus prevent binding or slipping of the film on either the spools or the rollers. Similarly, a pair of arcuate main side supporting frame elements 30 and 31, curved to substantially conform with and thus accommodate the curvature of said film 16 and the previously-described angled relation of said take-up and storage spools 20, 24 in rotatable relation thereto as by means of rotatably mounted shafts 48 and 49, are held in spaced, concentric relation as shown by means of a plurality of spacer elements 32. Since said main side supporting elements 30 and 31 provide support for said take-up and storage spools 20, 24, as well as the previously-mentioned plurailty of rollers interspersed therebetween, the latter are likewise progressively angled relative to each other in order to conform with the curvature of said film and maintain the proper spaced relation therebetween.

The previously-mentioned plurality of rollers consist of a rotatably mounted, main drive roller 25, a spring-pressed rubberized or pressure roller 26 rotatably mounted on the support mechanism 26a under tension of spring 26b to resiliently retain said roller 26 in an upward, contacting relation with the underside of roller 25, a single, rotatably mounted idler roller 27 and a pair of rotatably mounted, mutually supporting idler rollers 28 and 29 (note FIG. 2) positioned in spaced, angled relation to said single idler roller 27. The aforesaid film 16 is, of course, transported from film storage spool 24 to said take-up spool 20 by way of the aforementioned rollers. In connection with this, said film is fed from the bottom of film storage spool 24 to an engaged position between mutually supporting idler rollers 28 and 29. From the latter position, said film is fed from around the bottom of single idler roller 27 to a position over the top of drive roller 25 between contacting rollers 25 and 26 and, finally, underneath roller 26 to the bottom of take-up spool 24. Each roller consists of a cylinder tapered in similar manner to that of said spools 20, 24 to conform with the curvature of said film to thereby insure a positive grip along the entire longitudinally extending surface of said film. It is noted that film 16 is retained in the normal manner in a position immediately adjacent to and over the camera slit 18 (note FIG. 4) by means of a film platen. The latter is not shown since it forms no part of the present invention. The lens indicated schematically at 8 is positioned below slit 18 remote from said film at a distance corresponding to its focal length.

In operation of the above-described invention, three aerial strip cameras, as for example those indicated at 1, 2 and 3 in the drawings, are adapted for mounting in side-by-side relation in an aircraft. The center camera 2 is positioned with its optical axis in a vertical direction relative to the earth's surface or, in other words, camera 2 is depressed 90°. On the other hand, both left and right cameras 1 and 3 are positioned at an oblique angle relative to the vertical to record images of the terrain to be photographed in an oblique direction extending right and left, respectively, of the vertical in a lateral direction either to include the horizon (high oblique) or not to include the horizon (low oblique). The films for each of said cameras 1, 2 and 3 are fed past their respective camera slits between respective film storage and take-up spools at a speed of transport in direct proportion to the ground speed and in inverse proportion to the altitude of the aircraft. One form of film drive means utilized for this purpose is illustrated generally at 44 in FIG. 1 as including a first driven pulley 45 affixed to a rotatably mounted, first driven shaft 46 adapted for driving connection at one end thereof with the main camera film transport motor drive shaft (not shown) and interconnected at the other end thereof with an extension of drive roller 25, a second driven pulley 47 mounted in spaced, fixed relation thereto on a second rotatably mounted, supporting shaft 48 affixed at one end thereof to tapered cylinder 38 mounting take-up spool 20 and an endless, driven spring element 50 interconnected between said first and second driven pulleys 45, 47 for simultaneously driving said take-up spool 20 and said drive roller 25 on actuation of shaft 46. The main camera film transport motor drive shaft is not shown since it forms no part of the present invention. The curved films 16 and 17 incorporated in left and right oblique cameras 1 and 3, respectively, are proportionately curved, as hereinbefore described, in accordance with the ratios of the distances between the respective camera lens and the near and far points of terrain coverage to effect a graded image motion compensation (IMC) across the entire format of each film. Further, as hereinbefore indicated, a fast speed lens is normally restricted to a narrow field of view, while a wide field of view is restricted to a relatively slow speed lens. With poor illumination, as moonlight, high speed lenses and wide fields of view are necessarily required. Both of these desirable factors, namely, wide fields of view and high speed lenses are simultaneously combined in the oblique cameras of the present invention in which the field of view is enhanced through incrementation in both left and right oblique directions.

Thus, a new and improved aerial strip camera has been developed in the present invention wherein much greater lateral coverage of the terrain may be had, simultaneously, with greatly improved resolution and markedly reduced scale error especially for oblique images received by cameras set at an oblique angle to the vertical axis of the aircraft.

I claim:

1. In a photo-reconnaissance system, means for simultaneously increasing the amount of terrain photographed in a single run of an aircraft and improving the resolution thereof comprising a first camera adaptable for mounting within the aircraft with its optical axis vertically depressed to record images of the terrain directly below the aircraft and a second and third camera obliquely positioned adjacent to and on opposite sides of said first camera to simultaneously record images of the terrain to the left and right of the vertical in partial overlapping relation to that recorded by said first camera, said pair of obliquely positioned cameras being arranged with their respective optical axes disposed at an oblique angle to the vertical and each intersecting the vertically disposed, optical axis of said first-named camera at the same point, and means associated with the film incorporated in each of said pair of obliquely positioned cameras compensating for the difference in time of recorded images for the increasingly slow rate of motion of more remote objects comprising film lateral side edges formed as concentric arcs with the respective radii of each in the same ratio to each other as the ratio between the respective distances from the respective camera to the near and far images are to each other.

2. In a photo-reconnaissance system as in claim 1, and means for feeding film incorporated in each of said three cameras at a predetermined speed past the camera slit in direct proportion to the ground speed of the aircraft and in inverse proportion to the altitude, said feeding means comprising a main supply spool for storing said film, a main drive, metering roller adapted to be motor-driven for driving said film and positioned at an angle relative to said main supply spool in direct proportion to the curvature of the lateral side edges of said film to facilitate the transport thereof, a spring-pressed, rubberized roller in resilient engagement with said metering roller and similarly angularly positioned relative to said main roller for retaining said film in contacting, driving engagement between said metering roller and said spring-pressed roller, and a take-up spool for receiving said film on transport thereof by said metering roller.

3. In a photo-reconnaissance system as in claim 2, said compensating means consisting of film curved in preselected proportion to thereby form a faster moving side for receiving images of near objects and a slower moving side for receiving images of more distant objects and thus counteract this difference in the speed between the faster and slower moving sides, said film being curved in accordance with a specific ratio relative to the respective distances between the near and far objects and a predetermined camera lens to effect a progressively varying film speed across the entire film format.

4. A photo-reconnaissance system comprising three aerial strip cameras adapted to be mounted in side-by-side relation within an aircraft, including a center camera positioned with its optical axis depressed 90° to photograph terrain substantially immediately below the aircraft, a left oblique camera positioned with its optical axis at an oblique angle relative to the optical axis of said center camera to simultaneously photograph terrain extending from a first portion overlapping that photographed by said center camera in the region adjacent the vertical to include terrain objects at the more remote lateral distances in a right oblique direction and an identical right oblique camera positioned with its optical axis at an oblique angle relative to the optical axis of said center camera and opposite to that of said left oblique camera and intersecting said last-named optical axis at an identical point with the obliquely set optical axis of said left camera to simultaneously photograph terrain extending from a second portion overlapping that photographed by said center camera in the region adjacent the vertical to include terrain objects at the more remote lateral distances in a left oblique direction, and each of said oblique cameras having film incorporating side edges arranged in a pair of concentric arcs predeterminately curved relative to each other in proportion to the difference in speed between the images received from both near and far terrain objects to progressively decrease the film speed from one side edge to the opposite side edge and thus constitute means equalizing the normally unequal exposure time of terrain images received from the near and the more remote lateral distances covered by said left and right cameras with progressively slower moving apparent object speed being photographed across the entire film format in accordance with the ratio of the radii of said curved side edges.

5. A photo-reconnaissance system as in claim 4, each of said left and right cameras including a pair of arcuate main support, side members, a camera slit positioned immediately adjacent to and below the film utilized therewith, a main drive spool having oppositely disposed end piece elements angularly positioned in proportion to the ratio of curvature between the pair of concentric arcs of the lateral side edges of the film and a parallel, spring-pressed rubberized roller in resilient engagement with said main drive spool to receive the film therebetween and similarly arranged in angular relation thereto to facilitate positive, driving engagement with the film across the entire film format.

6. A photo-reconnaissance system as in claim 5, the pair of concentric arcs of the film of each of said left and right oblique cameras forming lateral side edges the radii of whose arcs are curved in direct proportion to the ratio of the distances between each of said cameras and the near and far terrain objects being photographed.

7. A photo-reconnaissance system as in claim 6, each of said obliquely set cameras having a main feed spool proportionately tapered and incorporating oppositely disposed rim elements, respectively, curved in conformance with the curvature of said film, a take-up spool similarly tapered and having oppositely disposed rim elements similarly curved in conformance with the curvature of said film, main drive tapered metering and spring-pressed rollers positioned relative to each other to receive film in driving engagement therebetween along the entire format of said film, and a plurality of tapered idler rollers interspersed therebetween for guiding said film during its transport between said feed and take-up spools, said spools and said rollers being positioned between a pair of main, side support frame members in the same plane but in angled, converging relation to each other in direct relation to the curvature of said film to insure that said film is engaged with even pressure along its entire front.

8. In a photo reconnaissance system having three aerial strip cameras adapted for mounting in side-by-side relation within an aircraft and including a centrally positioned camera mounted with its optical axis aligned vertically relative to the earth's surface for recording images of the terrain directly below the aircraft and a pair of obliquely set cameras positioned on opposite sides of said centrally positioned camera for simultaneously recording images of the terrain in an oblique direction to the left and right, respectively, of the vertical in overlapping relation to a portion of the images recorded by said centrally positioned camera, each of said oppositely positioned obliquely set cameras incorporating first means for transporting the film therein at a speed proportional to a predetermined ground speed and altitude of the aircraft, and second means compensating for the apparent difference in relative speed between the recording of near and far images received on the film of each of said pair of obliquely set cameras, said second means comprising film incorporated within each of said right and left oblique cameras having lateral side edges each respectively curved in direct proportion to the difference in elapsed time between images received from the apparently faster moving near objects and the apparently slower moving, more remote objects, said film transport means comprising film supply means, film storage means positioned in spaced relation to said film supply means, and film feed means positioned between said film storage and supply means comprising a main drive roller positioned at an angle relative to said film supply and storage means in direct proportion to the curvature of the lateral side edges of the film to facilitate the transport thereof, a pressure roller similarly angularly positioned in parallel, spring-pressed, contacting relation with said main drive roller to receive the film in driving engagement therebetween and a plurality of idler rollers interspersed between said main drive roller and said film storage means.

References Cited in the file of this patent

UNITED STATES PATENTS 2,955,518     Perry ------------------ Oct. 18, 1960